US009524589B1

(12) United States Patent
Goenka

(10) Patent No.: US 9,524,589 B1
(45) Date of Patent: Dec. 20, 2016

(54) INTERACTIVE TEXTILE ARTICLE AND AUGMENTED REALITY SYSTEM

(71) Applicant: WELSPUN INDIA LIMITED, Mumbai (IN)

(72) Inventor: Dipali Goenka, Mumbai (IN)

(73) Assignee: Welspun India Limited, Mumbai (IN)

(*) Notice: Subject to any disclaimer, the term of this patent is extended or adjusted under 35 U.S.C. 154(b) by 0 days.

(21) Appl. No.: 14/856,250

(22) Filed: Sep. 16, 2015

(30) Foreign Application Priority Data

Aug. 31, 2015 (IN) .......................... 3334/MUM/2015

(51) Int. Cl.
G09G 5/00 (2006.01)
G06T 19/00 (2011.01)
G06T 1/00 (2006.01)

(52) U.S. Cl.
CPC ........... G06T 19/006 (2013.01); G06T 1/0007 (2013.01); G06T 2210/16 (2013.01)

(58) Field of Classification Search
None
See application file for complete search history.

(56) References Cited

U.S. PATENT DOCUMENTS

| 7,885,857 B1* | 2/2011 | Fukuya | G06Q 10/06 705/26.5 |
| 2009/0075075 A1* | 3/2009 | Abrams | D06P 5/004 428/354 |
| 2010/0316832 A1* | 12/2010 | Abrams | D06Q 1/12 428/90 |
| 2013/0004747 A1* | 1/2013 | Schwarz | B32B 5/02 428/196 |
| 2015/0002506 A1* | 1/2015 | Saarimaki | G06T 11/60 345/419 |

OTHER PUBLICATIONS

Amores, "AR Carpet + Lego Mindstorms", http://www.judithamores.com/arcarpet.html, accessed Nov. 25, 2015, 2 pages.
Baby Playmats, "Dwinguler Story Telling Sensory Playmat—Aesop's Fables", http://www.babyplaymats.ca/products/dwinuler-story-telling-sensory-playmat-aesops-fables, ©2015, 4 pages.
(Continued)

Primary Examiner — James A Thompson
Assistant Examiner — Xilin Guo
(74) Attorney, Agent, or Firm — Baker & Hostetler LLP

(57) ABSTRACT

A system and method an interactive textile article including a textile material having a design object that includes one or more design object identifiers. The design object is associated with an augmented reality software program configured to include content related the design object. A processor configured to execute the augmented reality program so as to compile a design object depiction based the design object identifiers contained in the design object. The processor executes a first augmented content level of a plurality of augmented content levels so as to display 1) the design object depiction, 2) augmentation elements that are related to the design object, and 3) an input element configured to control the design object depiction and the augmentation elements.

29 Claims, 13 Drawing Sheets

(56) References Cited

OTHER PUBLICATIONS

Kuusk et al., "Bedtime Stories: Weaving Traditions Into Digital Technologies", Nordic Design Research Conference, www.nordes.org, 2013, 1-2.
Kuusk et al., "Crafting Qualities in Designing QR-coded Embroidery and Bedtime Stories", The Art of Research, Helsinki, 2014, 1-12.
Kuusk et al., "Crafting Smart Textiles—a meaningful way toward sustainability in the fashion field?", The Nordic Textile Journal, 2012, 7-15.
Kuusk et al., "Smart Textile Products and Services in Sustainability Context", Ambience '14&10i3m, Sep. 7-9, 2014, 1-8.
Kuusk, "Bedtime Stories Little Red Riding Hood", http://www.kristikuusk.com/?p=601, Nov. 2012, 5 pages.
Kuusk, "Designing Sustainable Smart Textile Services by Taking the Craftsmanship Approach", http://ww.kristikuusk.com/?p-1778, accessed Nov. 25, 2015, 16 pages.
Kuusk, "Exhibitions & Presentations", http://www.kristikuusk.com/?page%20id=16, accessed Nov. 25, 2015, 13 pages.
U.S. Appl. No. 14/757,514, Goenka.

\* cited by examiner

INTERACTIVE TEXTILE ARTICLE AND AUGMENTED REALITY SYSTEM

CROSS-REFERENCE TO RELATED APPLICATIONS

The present application claims the benefit under 35 U.S.C. §119 of Indian Patent Application No. 3334/MUM/2015, filed Aug. 31, 2015, the entire contents of which are incorporated by reference into the present application.

TECHNICAL FIELD

The present disclosure relates to an interactive textile articles and augmented reality system and related methods.

BACKGROUND

Augmented reality (AR) is a direct or indirect view of a physical, real-world object that is augmented (or supplemented) by computer-generated elements or sensory inputs such as sound, video, graphics or GPS data. AR technology functions by enhancing one's current perception of reality. AR technology can be implemented in the physical world whereby computer generated elements are projected onto physical objects. Alternatively, AR technology can be implemented through computing devices whereby computer generated elements are overlaid onto images of physical objects captured by the computing device. Advances in computing, such as user interface technologies, data processing, object recognition have created new opportunities for implementing augmented reality technologies on mobile computing devices, such as smartphones and tablets.

Textile articles, such as garments, bedding, curtains, etc., are ubiquitous products. In a given day, textile articles define much of our sensory experience (e.g. sound, sight, touch, smell). But advances in textile technologies has led to new interactions between the user and textile materials. For example, wearable technologies includes sensors embedded into the fabric structure of a garment. The sensors measure physiological parameters and signal data can be transmitted to a linked computing device. Textile articles, however, as ubiquitous as they are, have not yet converged in a meaningful way with the nearly ubiquitous digital technologies brought about by modern mobile devices and advanced communication networks.

SUMMARY

There is need to implement an augmented reality application that interacts with design elements of interactive textile articles. Accordingly, an embodiment of the present disclosure is a system that includes an interactive textile article including a textile material having a face and a back that is opposed to the face. At least one of the face and the back includes a design object. The design object includes one or more design object identifiers. The design object is associated with an augmented reality software program configured to include content related to the design object. The system also includes a computing device that includes a memory containing the augmented reality program. The augmented reality program includes a plurality of augmented content levels. The computing device further includes a processor configured to execute the augmented reality program that compiles a design object depiction that is based on one or more design object identifiers in the design object. The augmented reality program can also execute a first augmented content level of the plurality of augmented content levels. The first augmented content level is configured to display 1) the design object depiction, 2) one or more augmentation elements related to the design object, and 3) at least one input element configured to control the design object depiction and the one or more augmentation elements. In such an embodiment, the textile article is a blanket, bed linen, a comforter, a rug, a carpet, a tapestry, a set of curtains, any other home textile product, or a garment.

Another embodiment of the disclosure is a method for displaying augmented reality on a computing device based on an interactive textile article. The method includes scanning a portion of an interactive textile article that includes a design object so as to identify one or more design object identifiers of the design object. The method further includes the step of compiling a design object depiction based on the one or more design object identifiers contained in the design object. The method also includes executing a first augmented content level of the plurality of augmented content levels so as to display 1) the design object depiction, 2) one or more augmentation elements that are related to the design object, and 3) at least one input element that controls at least one of the design object depiction and the one or more augmentation elements.

Another embodiment of the disclosure is a method of making an augmented reality system. The method includes manufacturing a textile material having a face and a back that is opposed to the face such that at least one of the face and the back includes a design object including one or more design object identifiers. The method also includes forming the textile material into a textile article. The method can include packaging the textile article with one or more access codes. The input of the access codes into a user interface running a portal on a computing device, causes the augmented reality software application to be stored on a memory of the computing device. In such an embodiment, the augmented reality software application is configured to a) compile a design object depiction based on the one or more design object identifiers including in the design object. The augmented reality software application is further configured execute a first augmented content level of a plurality of augmented content levels, so as to display 1) the design object depiction, 2) one or more augmentation elements that are related to the design object, and 3) at least one input element that controls at least one of the design object depiction and the one or more augmentation elements.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, illustrative embodiments of the disclosure are shown in the drawings. It should be understood, however, that the application is not limited to the precise arrangements and instrumentalities shown.

DETAILED DESCRIPTION OF ILLUSTRATIVE EMBODIMENTS

Figure 1:
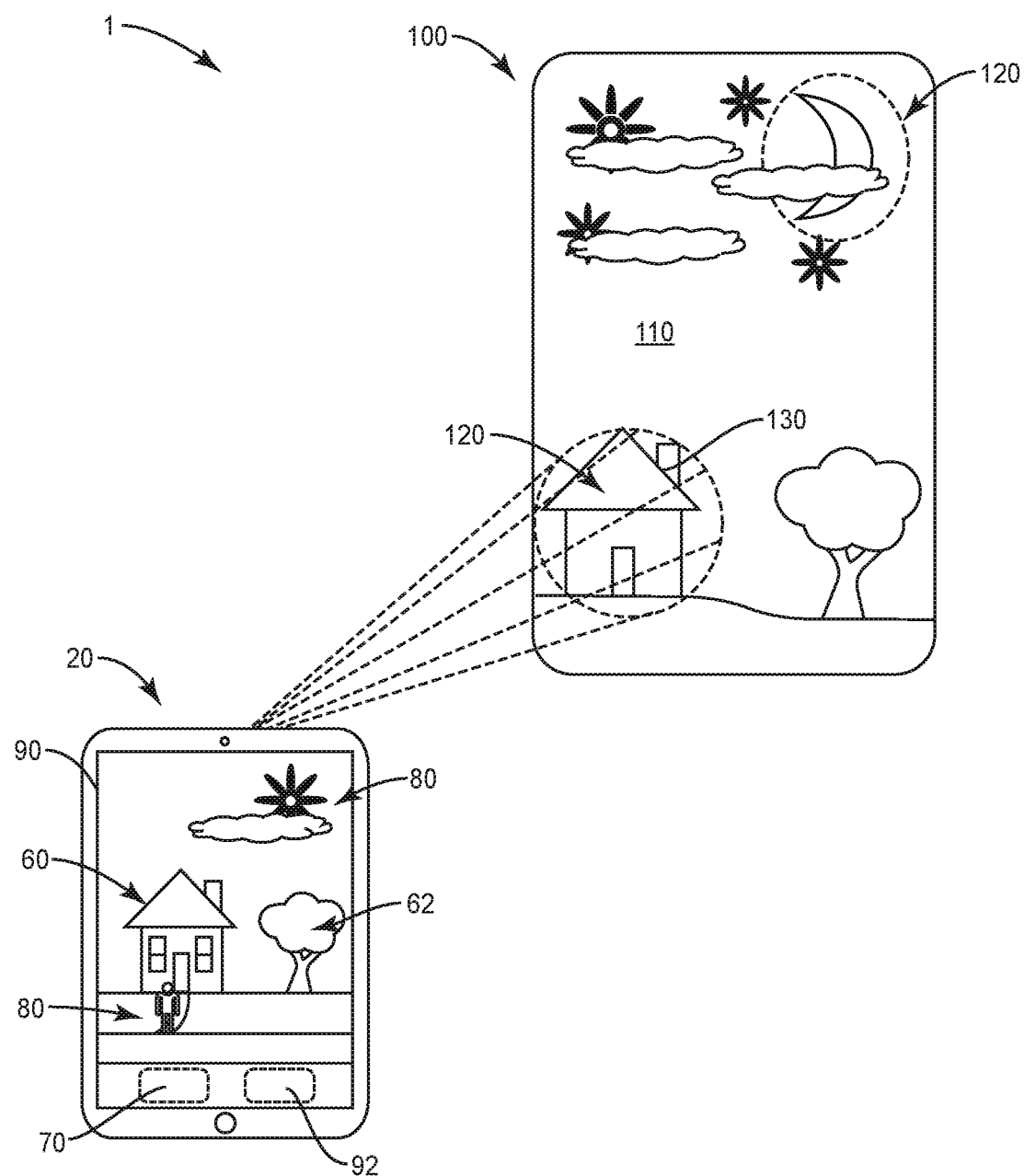
FIG. 1 is a schematic illustrating a computing device and an interactive textile article that can implement an augmented reality application, according to an embodiment of the present disclosure.

An embodiment of the present disclosure is a system 1 configured to implement an augmented reality environment on the computing device 20 based content that is related to one or more designs on the textile article 100. The system 1 can include an interactive textile article 100 and computing device 20. As illustrated, the textile article 100 includes a textile material 110 that includes one or more design objects 120. The computing device 20 can include a scanning device that can scan the textile material and can convert the scanned data into a digital data set. An augmented reality software program can cause the display of a) one or more design object depictions 60 and 62 that correspond to design objects 120 contained in the scanned data set, b) augmentation elements 80 than can manipulate the displayed environment, and c) input elements 70 that control design object depictions 60 and 62 and augmentation elements 80. A user can interact with displayed augmented reality via the input elements 70 through a series of content levels or levels that include content that is related the particular design object. In this way, the augmented reality and interactive textile system 1 is configured to allow a user to interact with different components of the textile article 100 through digital medium.

Figure 2:
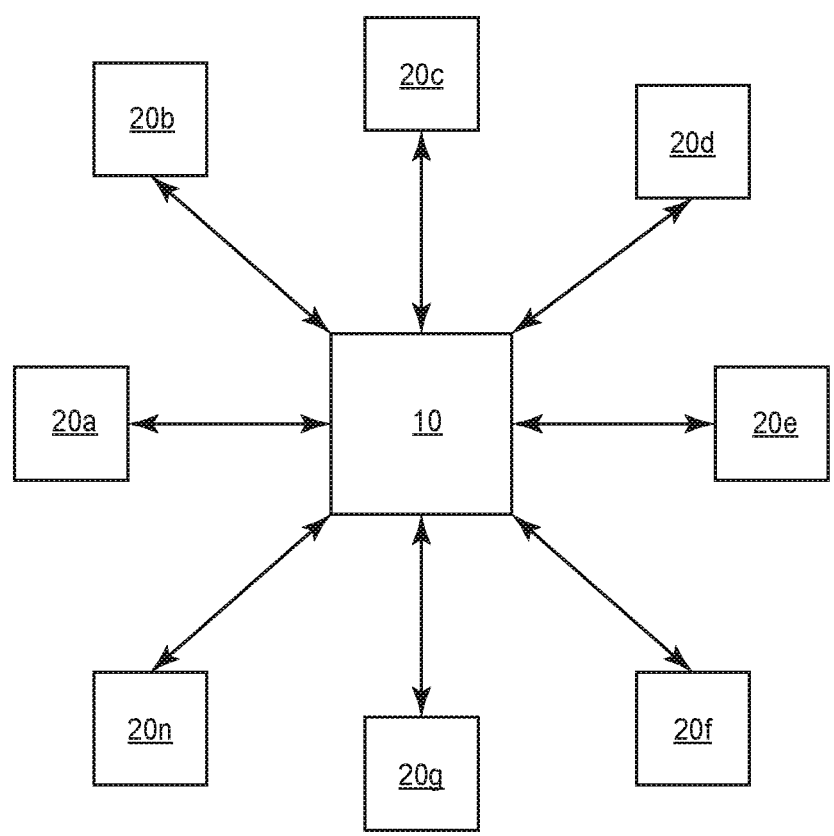
FIG. 2 is a diagram illustrating multiple, networked computing devices, according to an embodiment of the present disclosure.

Referring to FIG. 2, an embodiment of the present disclosure is a system 1 including at least one server computing device 10, a plurality of computing devices 20a, 20b, 20c, . . . 20n, in electronic communication with the server computing device 10, and one or more software applications 30s and 30c (see FIGS. 3 and 4) implemented across computing devices 10 and 20a, 20b, 20c . . . 20n. Each computing device 20a, 20b, 20c, . . . 20n may be associated with a different person or user. Furthermore, one or more up to all of the computing devices 20a-20n can be associated via social network. For purposes of clarifying how the software application is implemented across the various computing devices, reference number 20 is used interchangeably with reference numbers 20a, 20b, 20c . . . , 20n, unless noted otherwise. In addition, the present disclosure describes software applications implemented over system components and configured to execute various steps in the methods described below. It should be appreciated that a software application can implement steps in the described methods utilizing all of the system components or just portions of the system components. Furthermore, the software applications are described below in singular form. It should be appreciated that multiple software applications may interface to perform the described functions and multiple applications can run on more than one computing device to implement the methodologies described herein.

Continuing with reference to FIG. 2, the system 1 can be implemented via exemplary architecture that includes computing devices 10, 20a, 20b, 20c . . . , 20n in electronic communication with each other via a common communications network, such as, for example, the Internet. As illustrated, the computing devices 20a, 20b, 20c . . . 20n and server computing device 10 are arranged in a client-server architecture. The server computing device 10 can receive and transmit data to other computing devices 20 via the communications network. In addition, one up to all the computing devices 20 can receive information from the other computing devices 20. And one up to all of the computing devices 20 can transmit information to the other computing devices 20. Furthermore, one or all of the computing devices 10, 20 can access information on the other computing devices 10, 20. "Access" or "accessing" as used herein can include retrieving information stored in memory on a computing device. For instance, "access" or "accessing" includes sending instructions via the network from server computing device 10 to computing device 20a so as to cause information to be transmitted to the memory of the computing device 20a for access locally by the computing device 20a. In addition or alternatively, "access" or "accessing" can include the server computing device 10 sending an instruction to computing device 20a to access information stored in the memory of the computing device 20a. Reference to server computing device 10 and computing device 20a in this paragraph is exemplary and are used to only clarify use of words "access" or accessing."

FIG. 2 illustrates a client-server network. But the software application can be implemented over any number of network configurations. For example, in alternate embodiments, the computing devices 20a, 20b, 20c . . . 20n are configured as a peer-to-peer network architecture. In still other alternative embodiments, the computing devices 20a, 20b, 20c . . . 20n can be arranged in a ring-type network architecture. Further, the software application can be implemented across computing devices arranged on a network that includes aspects of a client-server network, peer-to-peer network, ring-type network, and/or other network architectures known to a person of ordinary skill in the art. Accordingly, it should be appreciated that numerous suitable alternative communication architectures are envisioned for implementing the software application 30 on a user's computing device.

Figure 3:
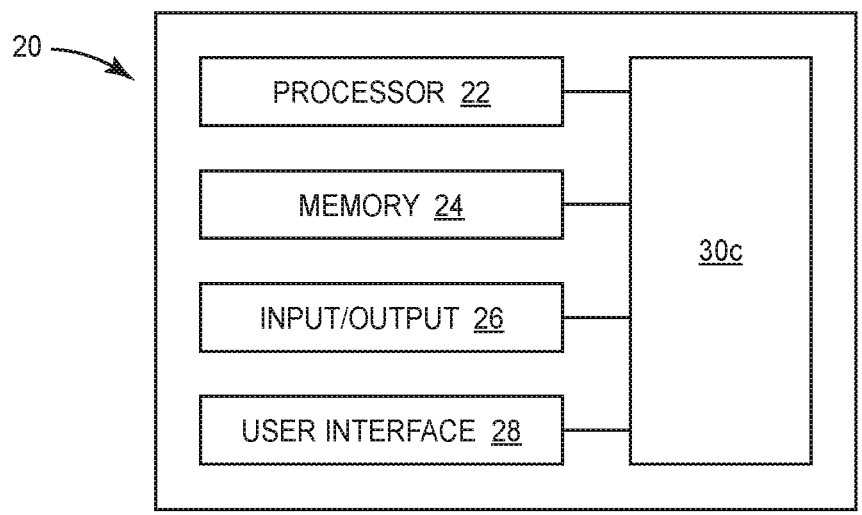
FIG. 3 is a client computing device as shown in FIGS. 1 and 2.

Turning to FIG. 3, the computing device 20 is configured to receive, process, and store various information used to implement one or more software applications, such as client software application 30c. It will be understood that the hardware components of computing device 20 can include any appropriate device, examples of which include a portable computing device, such as a laptop, tablet or smart phone, or other computing devices, such as, a desktop computing device or a server-computing device.

As illustrated in FIG. 3, the computing device 20 includes one or more processors 22, a memory 24, an input/output 26, and a user interface (UI) 28. It is emphasized that the operation diagram depiction of the computing device 20 is exemplary and not intended to imply a specific implementation and/or configuration. The processor 22, memory 24, input/output portion 26 and user interface 28 can be coupled together to allow communications therebetween, and can interface with the client software application 30c. The client software application 30c may include an application programmatic interface (API). As should be appreciated, any of the above components may be distributed across one or more separate devices. The computing device 20 can include scanning device, such a camera that captures an image of the design object 120. For instance, the camera may include charge-coupled device (CCD) or a contact image sensor (CIS) as the image sensor.

Continuing with FIG. 3, the memory 24 can be volatile (such as some types of RAM), non-volatile (such as ROM, flash memory, etc.), or a combination thereof, depending upon the exact configuration and type of processor 22. The computing device 20 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic storage or other magnetic storage devices, universal serial bus (USB) compatible memory, or any other medium which can be used to store information and which can be accessed by the computing device 20.

Continuing with FIG. 3, in various embodiments, the input/output portion 26 includes an antenna or an electronic connector for wired connection, or a combination thereof. In some implementations, input/output portion 26 can include a receiver and transmitter, transceiver or transmitter-receiver. The input/output portion 26 is capable of receiving and/or providing information pertaining to communication with a network such as, for example, the Internet. As should be appreciated, transmit and receive functionality may also be provided by one or more devices external to the computing device 20. For instance, the input/output portion 26 can be in electronic communication with a receiver.

Referring to FIG. 3, the user interface 28, which can include an input device and/or display (input device and display not shown) that allows a user to communicate with the computing device 20. The user interface 28 can include inputs that provide the ability to control the computing device 20, via, for example, buttons, soft keys, a mouse, voice actuated controls, a touch screen, movement of the computing device 20, visual cues (e.g., moving a hand in front of a camera on the computing device 20), or the like. The user interface 28 can provide outputs, including visual displays. Other outputs can include audio information (e.g., via speaker), mechanically (e.g., via a vibrating mechanism), or a combination thereof. In various configurations, the user interface 28 can include a display, a touch screen, a keyboard, a mouse, an accelerometer, a motion detector, a speaker, a microphone, a camera, or any combination thereof. The user interface 28 can further include any suitable device for inputting biometric information, such as, for example, fingerprint information, retinal information, voice information, and/or facial characteristic information, for instance, so as to require specific biometric information for access to the computing device 20. It should be appreciated that the computer devices can operate via any suitable operating system, such as Android, BSD, iOS, Linux, OS X, QNX, Microsoft Windows, Windows Phone, and IBM z/OS. Furthermore, the software application can operate with any of the aforementioned operation systems.

Figure 4:
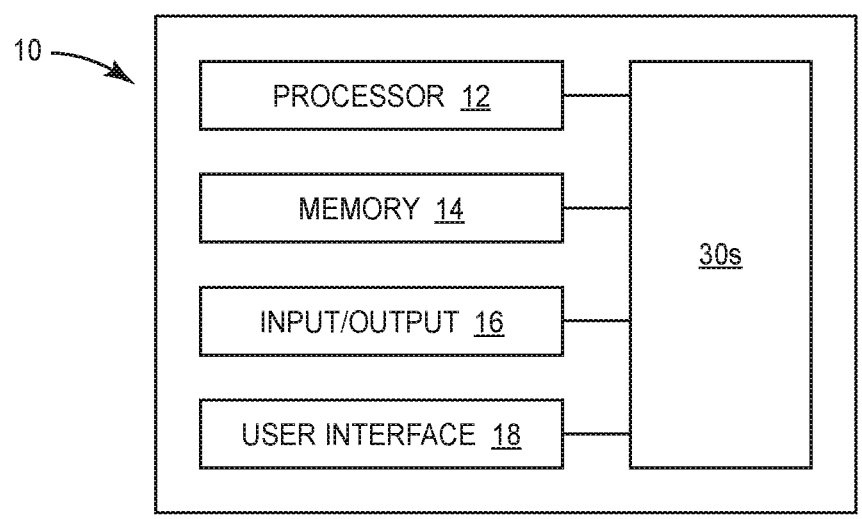
FIG. 4 is a server computing device shown in FIG. 2.

FIG. 4 is an operation diagram of the server computing device 10. The server computing device 10 includes one or more processors 12, a memory 14, an input/output 16, and a user interface (UI) 18, and one or more software applications, such as server software application 30s. The server software application 30s may also include an application programmatic interface (API). The processor 12, memory 14, input/output portion 16 and interface 18 can be coupled together to allow communications therebetween. As should be appreciated, any of the above components may be distributed across one or more separate server computing devices. The server computing device processor 12, memory 14, input/output 16, and interface 18 are similar to the processor 22, memory 24, input/output 26, and interface 28 described above with respect computing device 20. It should be appreciated that the server computer device can operate via any suitable operating system, such as Android, BSD, iOS, Linux, OS X, QNX, Microsoft Windows, Windows Phone, and IBM z/OS. It is emphasized that the operation diagram depiction of the server computing device 10 is exemplary and not intended to imply a specific implementation and/or configuration.

The software application 30 can comprise the client application 30c and the server application 30s. Accordingly, certain functions can be implemented on the server computing device 10 and other functions can be implemented on the client computing devices 20. Software application 30, client application 30c, server application 30s may be used interchangeably herein.

Figure 5:
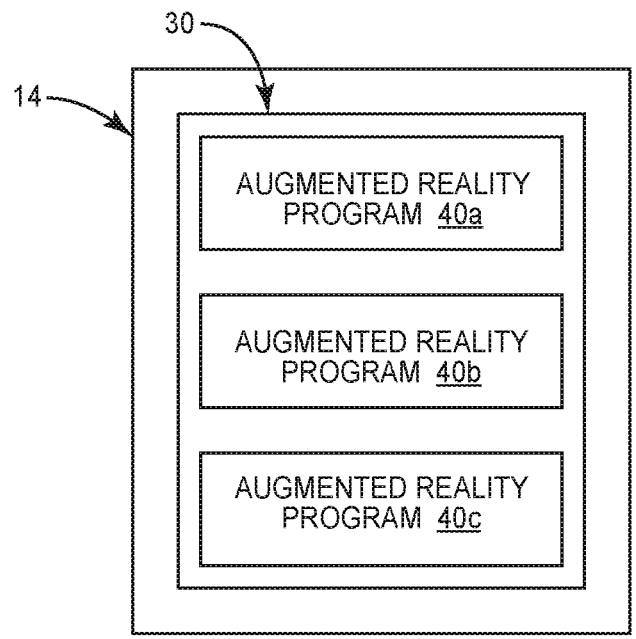
FIG. 5 is a schematic diagram illustrating multiple augmented reality programs contained in a memory of a computing device.

Referring to FIG. 5, the software application 30 can include one or more augmented reality programs 40 contained in the memory 14 of the server computing device 10 (or client computing device 20 as needed). As illustrated, memory 14 includes three augmented reality programs 40a, 40b, and 40c. It should be appreciated that more than the three augmented reality programs 40 can be stored on the server computing device 10 and/or optionally on the client computing device 20. Reference sign 40 will be used interchangeably with reference signs 40a, 40b, and 40c unless noted otherwise. In certain implementations, portions of an augmented reality program 40 may also be stored in memory 24 of a client computing device 20. In addition, in some instances, all of the augmented reality programs 40 can be stored on the server computing device 10 and transmitted to the client computing device 20. The memory 14 of computing device 10 may include a database (not shown) that contains the association between one or more augmented reality programs 40 and one or more different design objects embodied on textile article 100.

Figure 6:
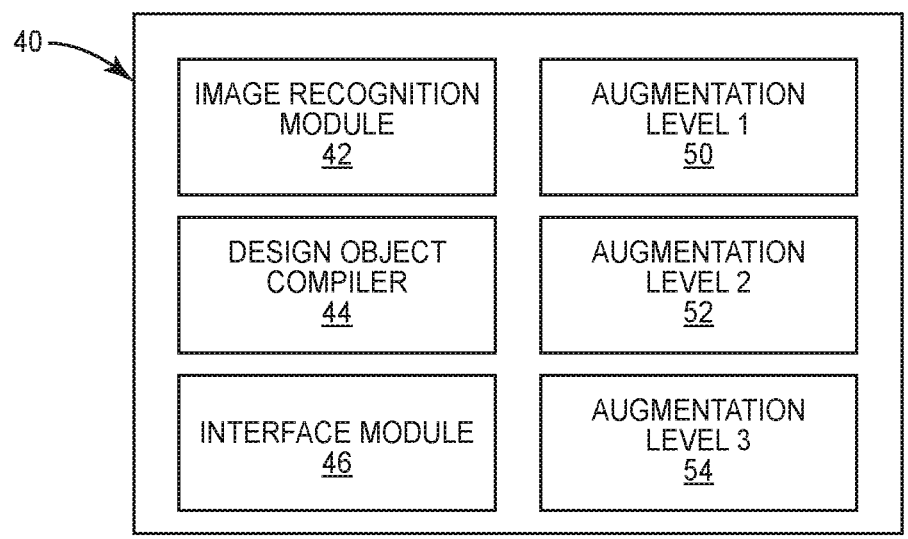
FIG. 6 is a schematic diagram illustrating an exemplary augmented reality program.

As shown in FIG. 6, each augmented reality program 40 includes an image recognition module 42, a design object compiler 44, an interface module 46, and a plurality of augmented content levels 50, 52, and 54. The image recognition module 42 is configured to process data captured via the scanning device, e.g. the camera, on the client computing device 20 and identify the design object. The image recognition module 42 can identify one or more design object identifiers in the captured scanned data of the design object. In some instances, spatial relationships are determined among the located design object identifiers. Based on the design object identifiers, the image recognition module 42 can compile a data set that is indicative of the design object contained in the image.

The design object compiler 44 can compile one or more design object depiction. A design object depiction is a virtual representation of the design object 120 embodied in the textile article 100. The design object compiler 44 can create the design object depiction based on the compiled data set and the geometric relationships between various design object identifiers. In other embodiments, the design object compiler 44 can also access design object depictions that may be stored on the computer memory 14 of the server device 10. In still other embodiments, the design object compiler 44 can compile design object depictions based on the compiled data set and a database of design models related to the design object. In such an embodiment, the design object compiler 44, when executed by the processor, determines which design models are associated with the compiled data parameters. Upon identification of the associated design models, the design object compiled can build a design object depiction from the design model and other parameters obtained in the compile data set, such as geometric data.

The interface module 46 is configured to interface the design object depiction with the augmentation levels as well as other data related to visual scene in the captured scanned data. In some instances, the interface module 46 can also integrate other portions of the image with the design object depiction and the augmentation levels.

Continuing with FIG. 6, the augmented content levels 50, 52, and 54 implement the design object depiction into an interactive augmented reality display on screen 90 (FIG. 1) of the computing device 20. Specifically, each augmented content level 50, 52, and 54 is configured to display on the screen 90 1) respective design object depiction 60 (or 62) (FIG. 1), 2) one or more augmentation elements 80 that are related to the design object 120, and 3) at least one input element 80 configured to control the design object depiction 60 and the one or more augmentation elements 80.

The augment reality program includes content related the design object 120. Furthermore, the content can be thematically associated with the design object 120 on the textile article 100 obtained in the image. For instance, as illustrated in FIG. 1, one exemplary design object is a house 120a The augmented elements 80 can partially define the content related to the design object depiction 60 the house 120a design into the textile material 110. For instance, augmentation elements 80 can include an arrangement of the house 120 in a virtual neighborhood that includes a street, a yard, neighboring houses, a tree, etc. The augmentation elements 80 can also include internal structures of the house, such as, a living room, kitchen, dining room, and a bedroom. The augmentation elements 80 are configured to dynamically respond to inputs received via the input elements, or alter the environment based on predefined rules. For example, in the example shown in FIG. 1, the augmentation elements 80 may be configured to modify the displayed environment based on a perceived time of day, e.g. the sun is out during the day and sets at night, such that lighting and shadows are shown in the display based on the perceived time of date. For example, the input element 70 can cause a person 80 to enter the house, turn on the lights, and enter different rooms. Accordingly, the input elements 70 permit the user to control and/or interact with the design object depiction 60 and the augmentation elements 80. The augmented content levels 50, 52, and 54 are configured to allow user progression through the augmented reality environment. Accordingly, the augmented content levels can also be referred to as a content level or stage. While a house 120a is shown in FIG. 1 and described above as the design object, the design object 120 can be any particular design. The related content in augment reality environment can therefore vary along with the particular design object embodied on the textile article.

As discussed above, the augmented reality program 40 includes a first augmented content level 50, a second augmented content level 52, and a third augmented content level 54. Each augmented content level 50, 52, and 54 can include one or design object depictions, such as design object depictions 60 and 62 as shown in FIG. 1. Each augmented content level may include similar content among the plurality of content levels. For example, all content is related to a house. Alternatively, each augmented content level 50, 52, and 54 may include content that varies among the plurality of augmented content levels. For example, content can related to house 120a in the first augmented content level 50, a tree in the second augmented content level 52, and the moon 120d in the third augmented content level.

In accordance with an embodiment, the second augmented content level includes one more design object depictions. For instance, the second augmentation level can include either or a first design object depiction based the design object contained in the initial image, or a second design object depiction based a second design object in the textile article. The second augmentation level also includes one or more second augmentation elements that are related to the respective design object and at least one second input element that controls the design object depiction and the one or more second augmentation elements. In the example shown in FIG. 1, if the design object 120 is the house 120a and the first augmentation element 80 relate to the structure of the house 120a, the second augmentation elements can include content specific to the kitchen in the house, for instance; to allow the user to engage virtual cooking. In another example if the second design object is the tree next to the house, and the first augmentation element relates to the structure of the house, the second augmentation elements include content specific to tree, for example, such as a tree structure for climbing, tree species, etc.

Furthermore, the third augmented content level includes either the design object depiction contained in the initial image, the second design object depiction, or a third design object depiction based a third design object of the textile article. The third augmentation level also includes one or more third augmentation elements that are related to the design object. The third augmentation level also includes at least one third input element that controls at least one of the design object depictions and the third augmentation elements. In one example, if the first design object is the house and first augmentation element relate the structure of the house, the third augmentation elements can include content specific to the neighborhood, such as streets. For instance, the third augmentation level can allow a user engage in a bike race through the neighborhood.

As the user progresses through and completes the first augmented content level 50, the user interface displays a content change element 92 (FIG. 1). Selection of the content change element 92 can initiate the second augmented content level 52. As the user progresses through and completes the second augmented content level 52, the user interface displays another content change element. Selection of the content change element 92 can initiate the third augmented content level 54. At each step where a subsequent augmented content level is initiated, the application can cause the display of a payment portal to access the next augmented content level. Although three augmented reality content levels are illustrated, the augmented reality program 40 can have two or more than three augmented content levels.

Figure 7:
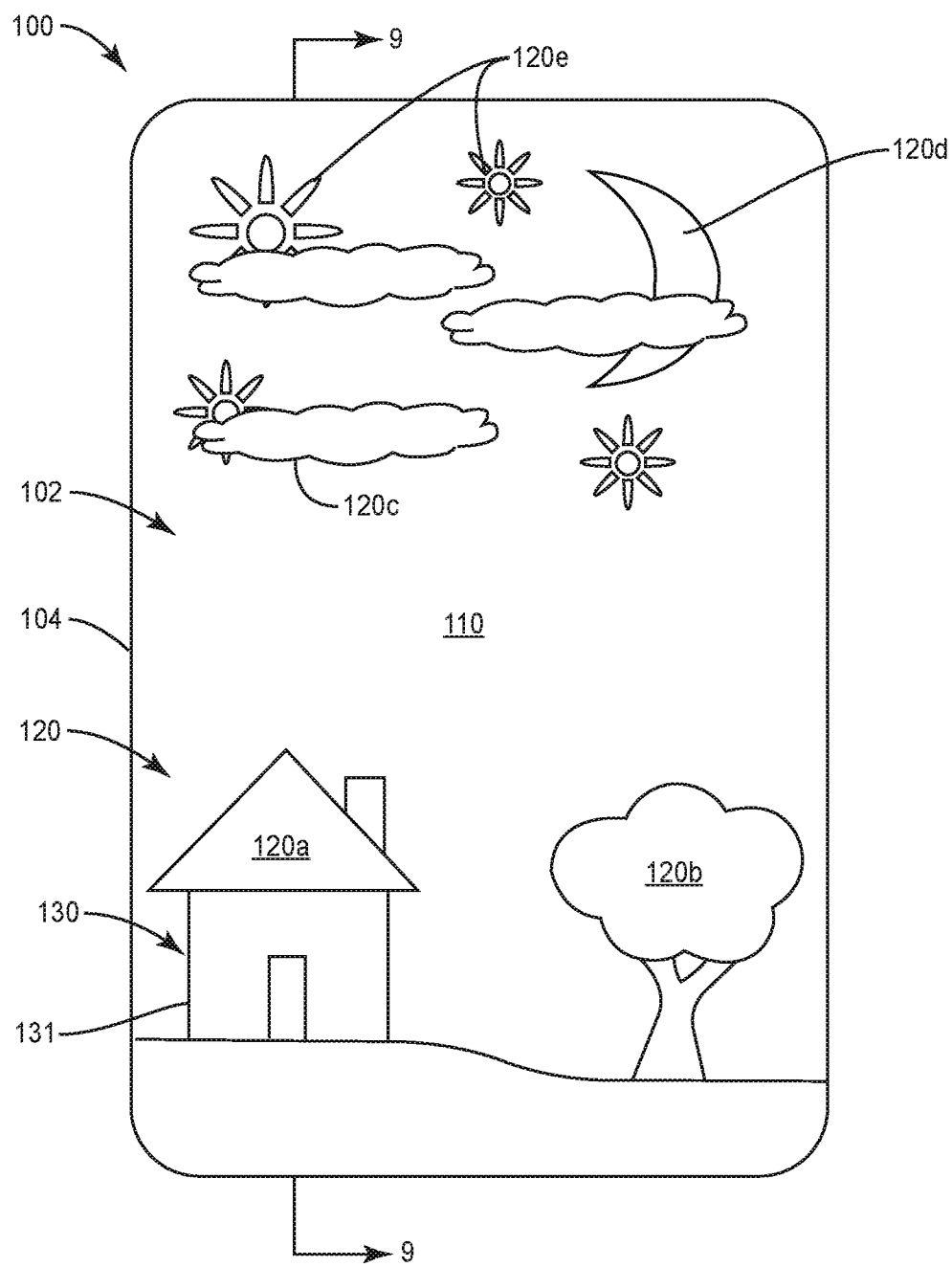
FIG. 7 is an enlarged schematic view of an interactive textile.
Figure 8A:
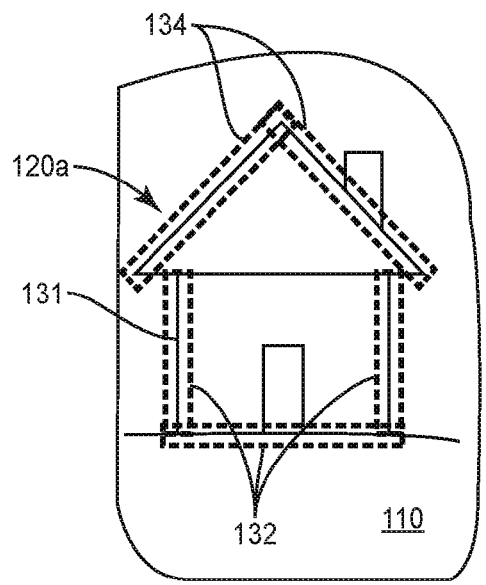
FIGS. 8A-8C are detailed views of design objects embodied in the textile article shown in FIG. 7.
Figure 8B:
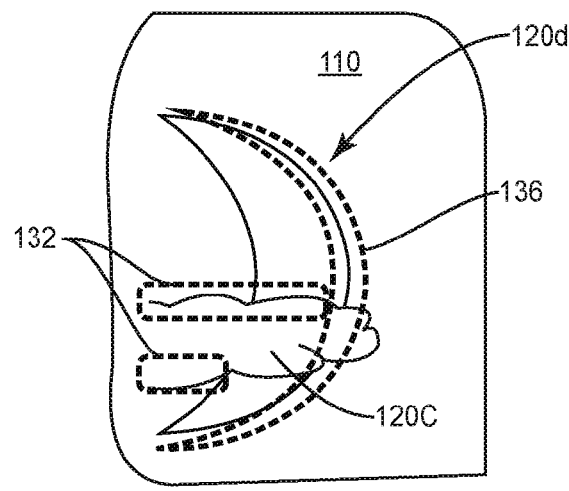
Figure 8C:
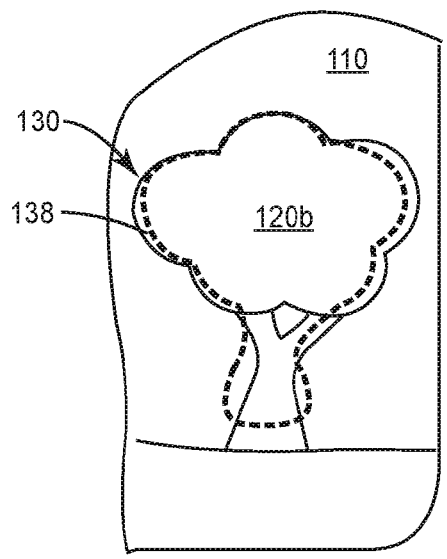

Turing now to FIGS. 7-8C, the interactive textile article 100 is illustrated. As illustrated, the textile article 100 is a blanket 102 including a border 104 that defines a perimeter of the textile article 100. The textile article 100 can be any other article that includes generally planar textile material that forms a substantial component of the article. Furthermore, a textile article 100, as used herein includes, but is not limited to, a blanket, bed linen, a comforter, a rug, a carpet, a tapestry, a tapestry, a set of curtains, or a garment. The textile article 100 can be packaged with one or more access codes. The access codes can be tags, alphanumeric codes, QR codes, hyperlinks including on a textile material itself or on tags package with the textile article 100. Input of the access codes into an interface on the computing device 20, causes augmented reality software application 30 to be stored on a memory of the computing device 20.

Figure 9:
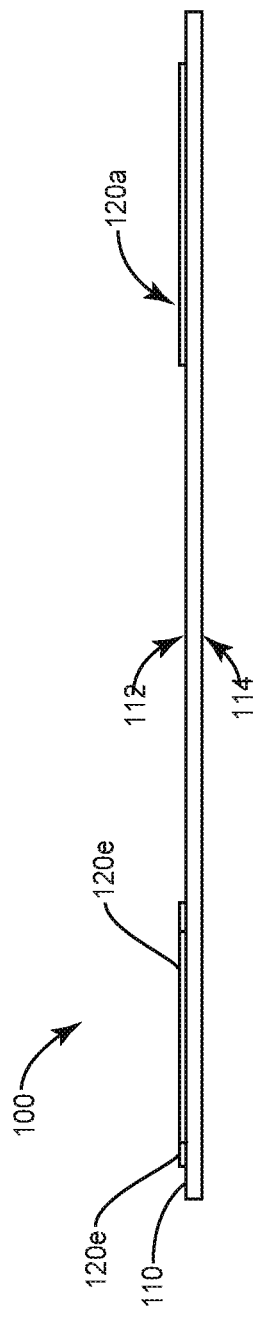
FIG. 9 is a sectional view of the textile article taken along line 9-9 in FIG. 7.
Figure 10:
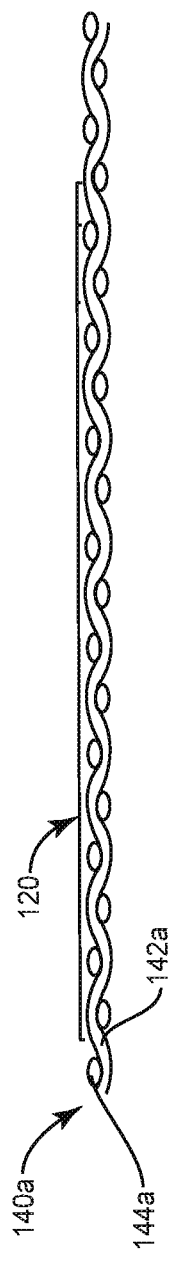
FIG. 10 is a sectional view of a portion of a woven textile including printed design objects, according to an embodiment of the present disclosure.

Turning to FIGS. 7 and 9, as described above, the textile article 100 includes a textile material 110 and at least one (a plurality) of design objects 120. The design objects include one or more design object identifiers 130. The textile material 110 has a face 112 and a back 114 that is opposed to the face 112. The design objects 120 are disposed on the face 112 of the textile material 110. In some instances, the design object may be disposed on the face 112 and back 114 of the textile material. The textile material is further described below. As illustrated, the textile material 110 includes multiple design objects, such as a house 120a, a tree 120b, clouds 120c, moon 120d, and stars 120e. FIG. 7 is an exemplary illustration of design object embodied in the textile article 100. Thus, the design objects 120 can be any design, shape or arrangement of elements. For instance, the design object may include, but is not limited to, a person, a building, an automobile (FIG. 15A), an airplane (FIG. 15B), a boat, a castle (FIG. 15C), sports gear (e.g. a football, soccer ball, basketball, golf club and golf ball, baseball and bat), an animal, a geographic location, a landscape, a forest, a tree, a mountain, a river, a lake, an ocean, a sun, a star, a moon, a planet, or a galaxy. The design object may also be a character from an audio-visual work, a literary work, or a theatrical work, or any type of multi-media animation. For instance, the design object can include one or more characters within the portfolio of Disney branded characters, such as characters from the Frozen franchise, or other Disney characters. In another example, the design object can include one or more characters, such as Spider-man, Superman, Batman, X-Men, or other contemporary characters.

Referring to FIGS. 7-9C, each design object 120 includes one or design object identifiers 130. The design object identifier can be one or more portions the design object 120. In one example, the design object identifier 130 is one more the edge portions 131 of design object 120. For example, the edge portion can be a linear edge, angled linear, a curved edge, a circular edge, or an intersection of two edges. The edge portion can be defined by contrast between two colors in the design. FIGS. 8A-8C, illustrate exemplary object identifiers for design objects illustrated as the house 120a, a tree 120b, clouds 120c, and the moon 120d. In FIG. 8A, the design object 120a includes object identifiers configured as linear design elements 132 and angled elements 134. In FIG. 8B, the moon 120d includes object identifiers configured as curved elements 136. In FIG. 8C, the tree 120b includes object identifiers configured as monolithic shape elements 138.

The object identifiers are illustrated as components of the design object. In alternative embodiments, the object identifier can be a code, an alphanumeric code, QR codes, embedded into or printed onto the textile material. Such an electronic code can be associated with predefined design object stored in the server memory 14. The image recognition module 42 can be used to identify the design object on the textile material. In still other embodiments, the object identifier can include an electronic object identifier in the form of a transmitter formed into the textile structure via a yarn or conductive printed materials. The electronic object identifier can transmit signal concerning the design object to the computing device.

Figure 11:
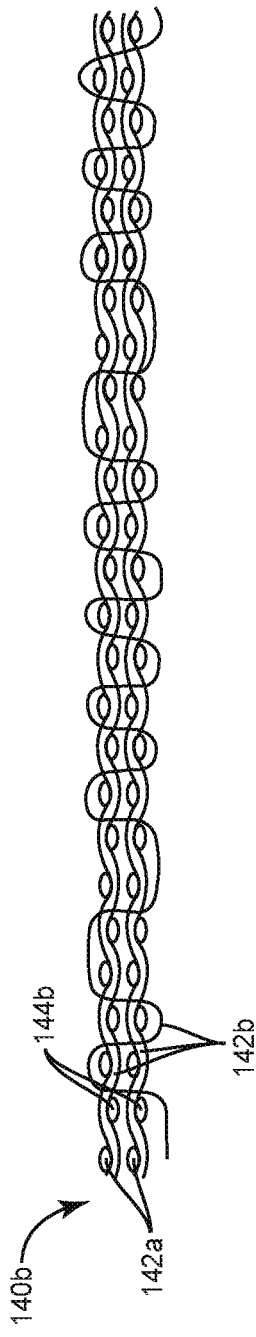
FIG. 11 is a sectional view of a portion of a woven textile with integrally formed design objects, according to an embodiment of the present disclosure.

The textile material 110 can be a woven fabric, a knit fabric (weft or warp), a nonwoven fabric, and laminates thereof. In other embodiments, the textile material can be laminate that includes: a) one or more films and a woven fabric; b) one or more films and a knit fabric; and c) one or more films and a nonwoven fabric. Regardless of the construction, the design object 120 can be integrally formed into the textile material, as illustrated in FIGS. 11-13. Alternatively, the design object may be printed onto the textile material, as illustrated in FIGS. 9, 10, and 15A-15C.

In accordance with one embodiment, the textile material 110 can be a woven fabric 140 that defines a woven structure with the design object 120 is integrally formed into the woven structure. As shown in FIG. 11, the woven fabric 140b includes a plurality of warp yarns 142b interwoven with a plurality of weft yarns 144b to define the design object 120. For instance, the areas where the warp yarns 142b are exposed to the face of the fabric can be arranged in such a way so as to define the design object 120 and object identifier 130. In such an example, woven fabrics can be based on dobby, jacquard, complex (multiple warps), 3D fabric weaving systems, which can be used to create simple to complex patterns on the face of the woven fabric. FIG. 11 illustrates an embodiment of woven fabric 140a utilizing a multiple warp system to create complex design objects.

Figure 14A:
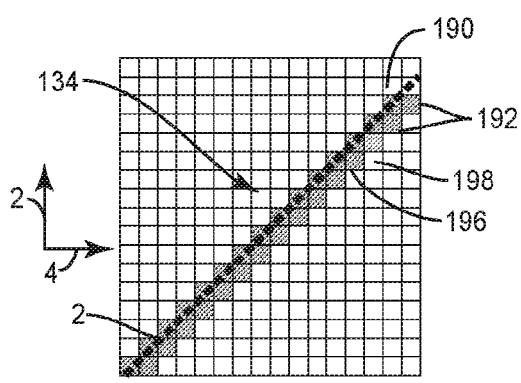
FIGS. 14A-14F are schematic illustrations of fabric design elements.
Figure 14B:
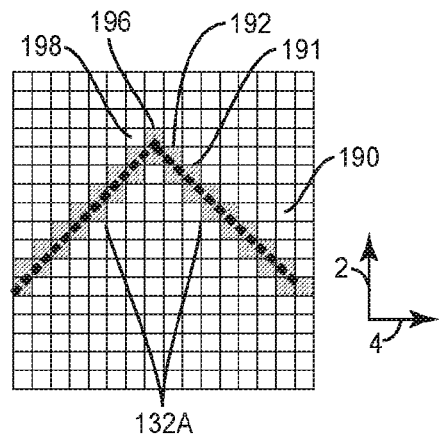
Figure 14C:
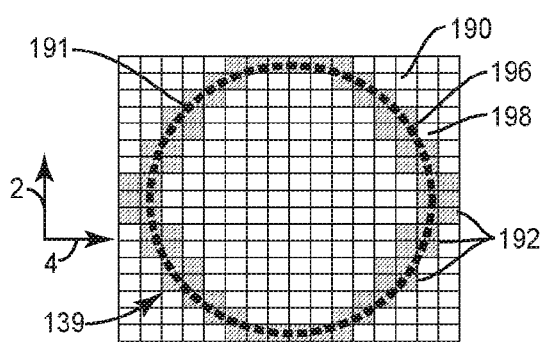
Figure 14F:
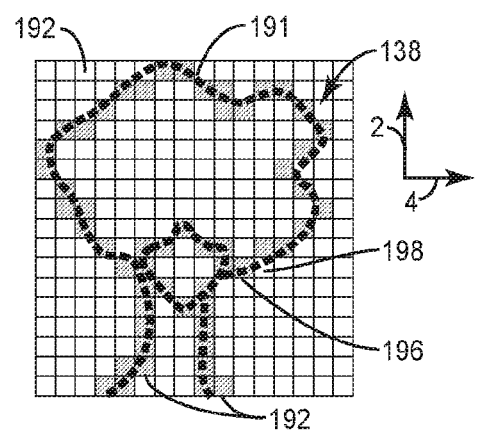
Figure 14D:
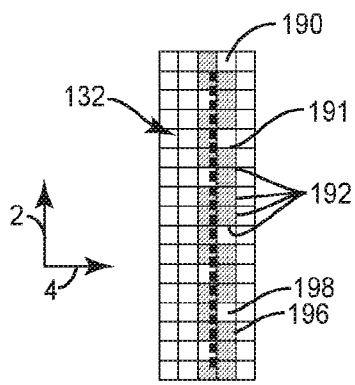
Figure 14E:
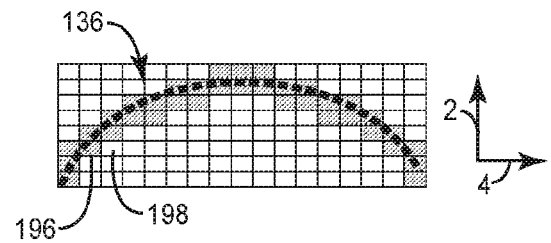

FIGS. 14A-14F are schematic diagrams illustrating how the warp yarns and weft yarns in the woven fabric design can define the object identifier 130. Each diagram includes multiple unit cells 190 with a machine or warp direction 2 that is perpendicular to a cross or weft direction 4. For woven structures, the shaded cells 192 represent a warp yarn exposed to the fabric face over a weft yarn. Thus, the woven fabric 140 can define a series of warp yarns exposed on the face in such way to define a linear edge design element 132. An angled linear design element 134 is shown FIG. 14A and a linear design element 132 aligned with the warp direction is shown in FIG. 14D. Furthermore, the fabric design can define two linear elements 132a that intersect, as illustrated in FIG. 14B. In another example, the woven fabric design can define a circular design element 139, as shown in FIG. 14C. In yet another example, as shown in FIG. 14E, the woven structure can define a curved element 136. In still another example shown in FIG. 14F, the woven structure can define a complete shape element 138 depending on the type of fabric formation system used. Furthermore, woven structures can appear pixilated at the location where the warp yarn travels back beneath the weft yarn (see e.g. intersection of until cells 196 and 198 in FIGS. 14A-14F). The image recognition module 42 described above is configured to account for such a pixilation by compiling a design element line along the identified design element, similar to the line 191 shown in FIGS. 14A-14F. The design element line 191 can be used to define the edge of the design object, and therefore an object identifier as described above. Furthermore, in alternative embodiments, the woven fabric can include distinct sets of weft yarns or in-laid yarns that are exposed to the face adjacent the warp facing yarn. The distinct in-laid yarns may be a different color, construction or fiber type that helps further define the specific design element and line path 191.

Figure 12A:
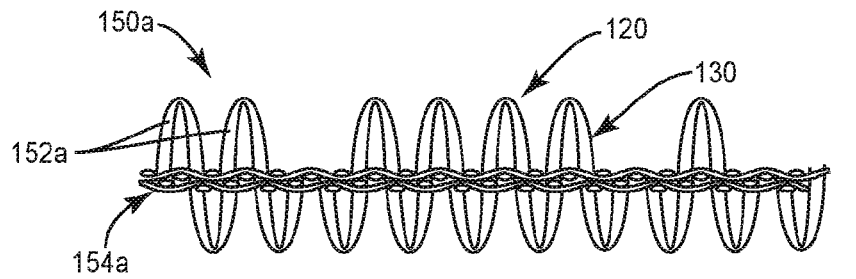
FIGS. 12A-12C illustrate alternative embodiments of pile fabrics with integrally formed design objects.
Figure 12B:
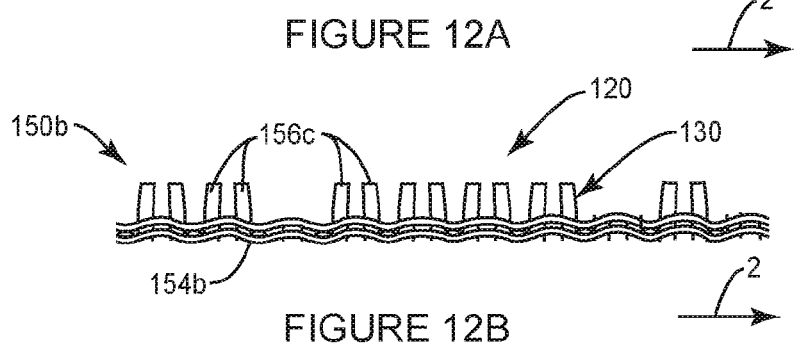
Figure 12C:
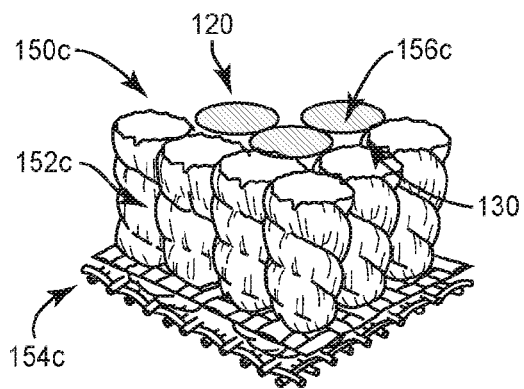
Figure 13:
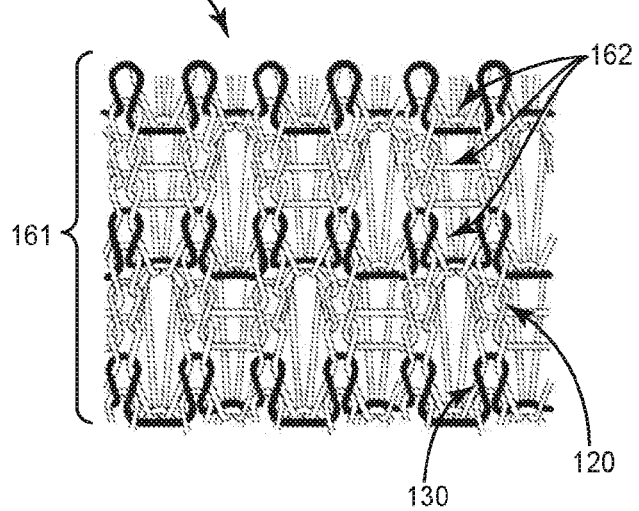
FIG. 13 is a schematic plan view of a portion of a knitted textile, with integrally formed design objects, according to an embodiment of the present disclosure

FIGS. 12A-12C illustrate a textile material configured as pile fabric that includes a pile structure and a design object integrally formed in the pile structure. In such embodiments, specific piles can be formed from different colored yarns arranged so as to define a portion of the design object 120. In addition, one or more pile floats can be formed into the pile fabric to define a design element, such an edge of a design object 120. As shown in FIG. 12A, a pile fabric 150*a* includes looped piles 152*a* and a ground or base fabric 154*a*. The looped piles 152*a* are selectively placed along a warp and weft direction 2 and 4 (weft direction 4 not shown) so as define portion of the design object 120 and an edge that define an design object identifier. As shown in FIG. 12B, a pile fabric 150*b* includes cut piles 152*b* and a ground or base fabric 154*b*. The cut piles 152*b* are selectively placed along a warp and weft direction 2 and 4 (weft direction 4 not shown) so as define portion of the design object 120. Floats can define an edge or design object identifier 130. As shown in FIG. 12C, a pile fabric 150*c* configured as tuft rug that includes cut piles 152*c* and a ground or base fabric 154*c*. One or more of cut piles 152*c* include color yarns 156*c* that are selectively placed along a warp and weft direction 2 and 4 (not shown) so as define portion of the design object 120. The edge of colored yarns 156*c* can define an edge or design object identifier 130.

FIGS. 14A-14F can also illustrate how various pile yarns in a pile fabrics 150*a*, 150*b*, and 150*c* can define the design object 120 and the one or more object identifiers 130. For instance, for a pile fabrics 150*a*, 150*b*, and 150*c*, each unit cell in design illustrations in FIGS. 14A-14F could represent a single pile. The shaded cells 192 can represent specific piles formed from different colored yarns arranged so as to define a portion of the design object. Unshaded shells can represent different yarns or pile floats. Thus, the pile fabric can include pile yarns of a first color or type arranged to define an angled linear design element 134 is shown FIG. 14A, and a linear design element 132 aligned with the warp direction 2 is shown in FIG. 14D. Furthermore, the piles fabric design can arrange the first color pile yarns arranged to define: two linear elements 132*a* that intersect as illustrated in FIG. 14B; a circular design element 139 shown in FIG. 14C; a curved element 136 as shown in FIG. 14E; or a complete shape element 138 as shown in FIG. 14F.

In another embodiment, the textile material is a knit fabric 160 includes a knit structure 161 and design objects 120 integrally formed into the knit structure 161. FIG. 13 illustrates an exemplary schematic of a knit fabric 160 with a knit structure 161 having the a plurality of knit stiches 162 that define the design object 120. The arrangement of knit stiches 162 can further define the object identifier 130. The knit fabric 160 may be a weft knit, such as a double knit, rib knit, or jacquard knit formed to define specific arrangements of knit stiches 162. The knit stiches 162 may include tuck, held, float stiches, and/or inlaid yarns.

Furthermore, the FIGS. 14A-14F also illustrate how various yarn components in knit structure define the design object 120 and object identifier 130. For instance, for a knit structure, the shaded cells 192 can represent a specific stitch type, such as a tuck, held, or float stitch, or inlay. The shaded shells 192 represent a knit structural component that is used to define a portion of the design object 120. Again, specific yarn types can be inserted or inlayed adjacent to knit stiches represented by the shaded cells 192 in order to further define the edge or design element, as described above. FIGS. 14A-14F can also illustrate how various knit structure in a knit fabric 160 can define the design object 120 and the one or more object identifiers 130. For instance, for knit fabrics 160, each unit cell in design illustrations in FIGS. 14A-14F could represent a knit stitch. The shaded cells 192 can represent specific types of knit stitches. Thus, the knit fabric 161 can define an arrangement stitches to define: an angled linear design element 134 is shown FIG. 14A; a linear design element 132 aligned with the warp direction 2 is shown in FIG. 14D; two linear elements 132*a* that intersect as illustrated in FIG. 14B; a circular design element 139 shown in FIG. 14C; a curved element 136 as shown in FIG. 14E; or a complete shape element 138 as shown in FIG. 14F. The knit fabric may alternatively be a warp knit, such as a tricot or rachel warp knitted fabric.

The woven, knit and pile fabrics can be formed from a wide range of fiber types and yarn formation systems. For example, the woven, knit and pile fabrics can be formed from any number of yarn types, such a spun yarns or continuous filament yarns. Spun yarns may include natural fibers, synthetic fibers, or blends of natural and synthetic staple fibers. Natural fibers include cotton, wool, or others. Synthetic fibers may include polyethylene terephthalate (PET), viscose rayon, acrylic, or other fiber types, such as flame resistant fibers, as needed. Suitable thermoplastic synthetic staple fibers may be mono-component, bi-component, or tri-component type fibers. Such fibers can be splitable to define microfibers. A variety of yarn spinning types can be used, such as ring spun, open end, air-jet, and the like. Spun yarns, can therefore include: spun cotton yarns and/or spun cotton and polyethylene terephthalate (PET) blended yarns. Continuous filaments yarns may include either or both mono-component or bicomponent filaments types. Continuous filament yarns can be polyethylene terephthalate, polyolefin, and/or polyamide 6, polyamide 6,6, polylactic acid filaments.

The textile material 110 may also be a nonwoven fabric having a design object 120 printed thereon. Any suitable printing technique can be used to define the design object. Suitable nonwoven fabrics, include melt-spun nonwovens, such as spunbond and meltblown materials. A meltspun nonwoven can include a single spunbond layer, multiple spunbond layers, a single meltblown layer, multiple meltblown layers, or multiple layers of spunbond and meltblown materials. Meltspun nonwovens can be formed with polyethylene terephthalate, polyolefin, and/or polyamide 6, polyamide 6,6, or polylactic acid polymers. Nonwoven fabrics can be formed with mono-component, bi-component, or tri-component fibers. Such fibers can be splitable and further processed to define microfibers. One suitable nonwoven fabric is Evolon® manufactured by Freudenberg & Co. Alternatively, the nonwoven fabrics can be bonded thermally bonded, chemically bonded, and/or mechanically bonded, e.g. via needles, stitch bonded, or hydraulically bonded. In alternative embodiments, the nonwoven fabrics can be embossed to define one or more design objects.

In another embodiment, the design object 120 can be printed on the any one of the aforementioned textile materials including, nonwoven materials. Printing can include digital printing, screen printing, sublimation printing. For instance, in one example, the textile material can be a woven fabric 140 with the design object 120 printed on its face 112 (and/or back). In another example, the textile material can be a weft knitted fabric 150 with the design object 120 printed on its face 112 (and/or back). In another example, the textile material can be a warp knitted fabric with the design object 120 printed on its face 112 (and/or back). In another example, the textile material can be a nonwoven fabric with the design object 120 printed on its face 112 (and/or back).

Figure 15A:
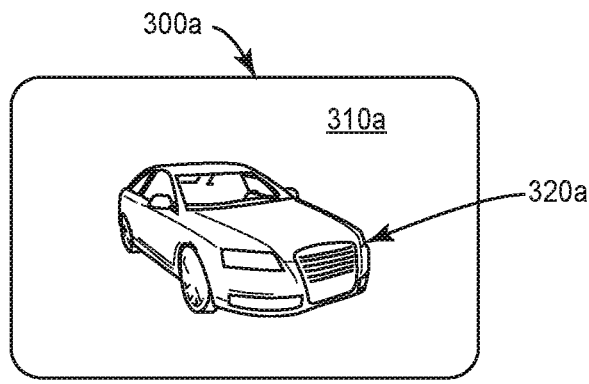
FIGS. 15A-15C illustrate alternative design objects applied to a textile article.
Figure 15B:
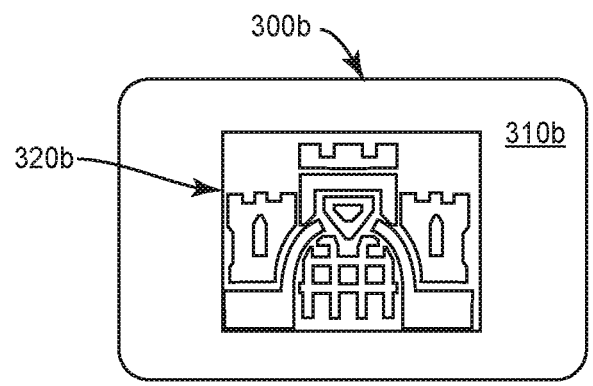
Figure 15C:
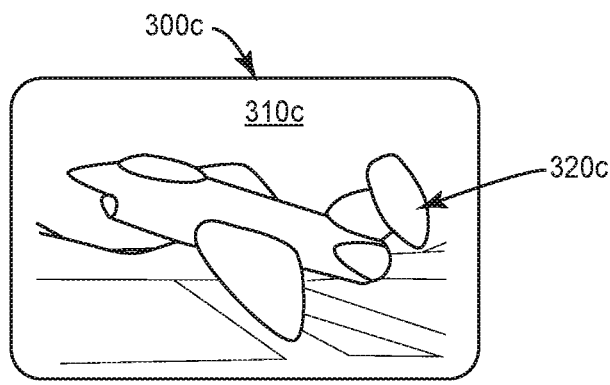

FIGS. 15A-15C illustrate alternative embodiments of a textile article 300a, 300b, and 300c. Textile articles 300a, 300b, and 300c include textile materials 310a, 310b, and 310c, respectively. Textile articles 300a, 300b, and 300c, include design objects 320a, 320b, and 320c printed onto the textile material. In FIG. 15A, the design object 320a can be an automobile, such as a race car. Content in the related augmented reality program is related to race cars. In FIG. 15B, the design object 320b can be a castle. Content in the related augmented reality program is related to a castle. In FIG. 15C, the design object 320c can be an airplane. Content in the related augmented reality program is related to an airplane.

Figure 16A:
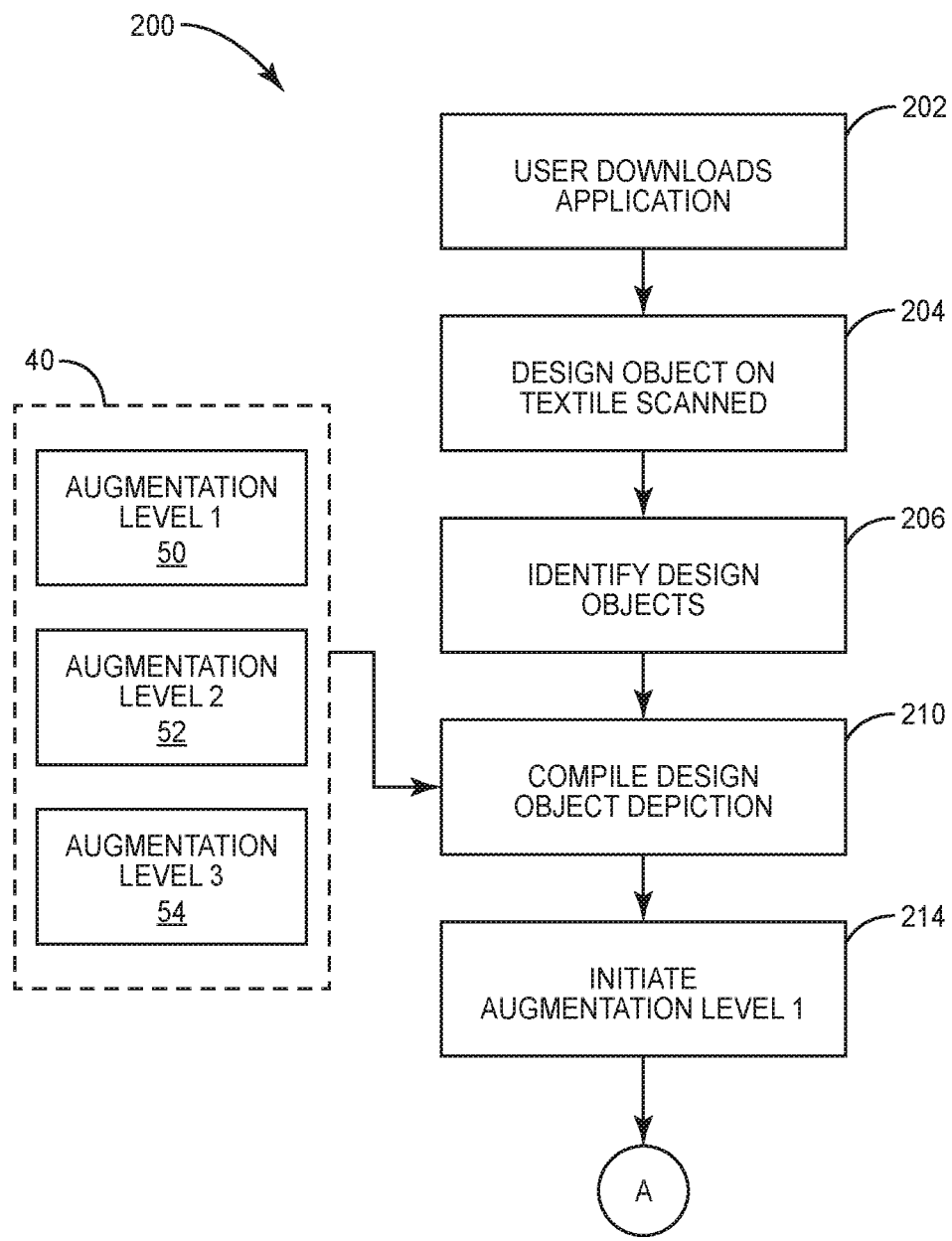
FIGS. 16A-16C are process flow diagrams illustrating a method for implementing an augmented reality application based on design elements with an interactive textile, according to an embodiment of the present disclosure.
Figure 16B:
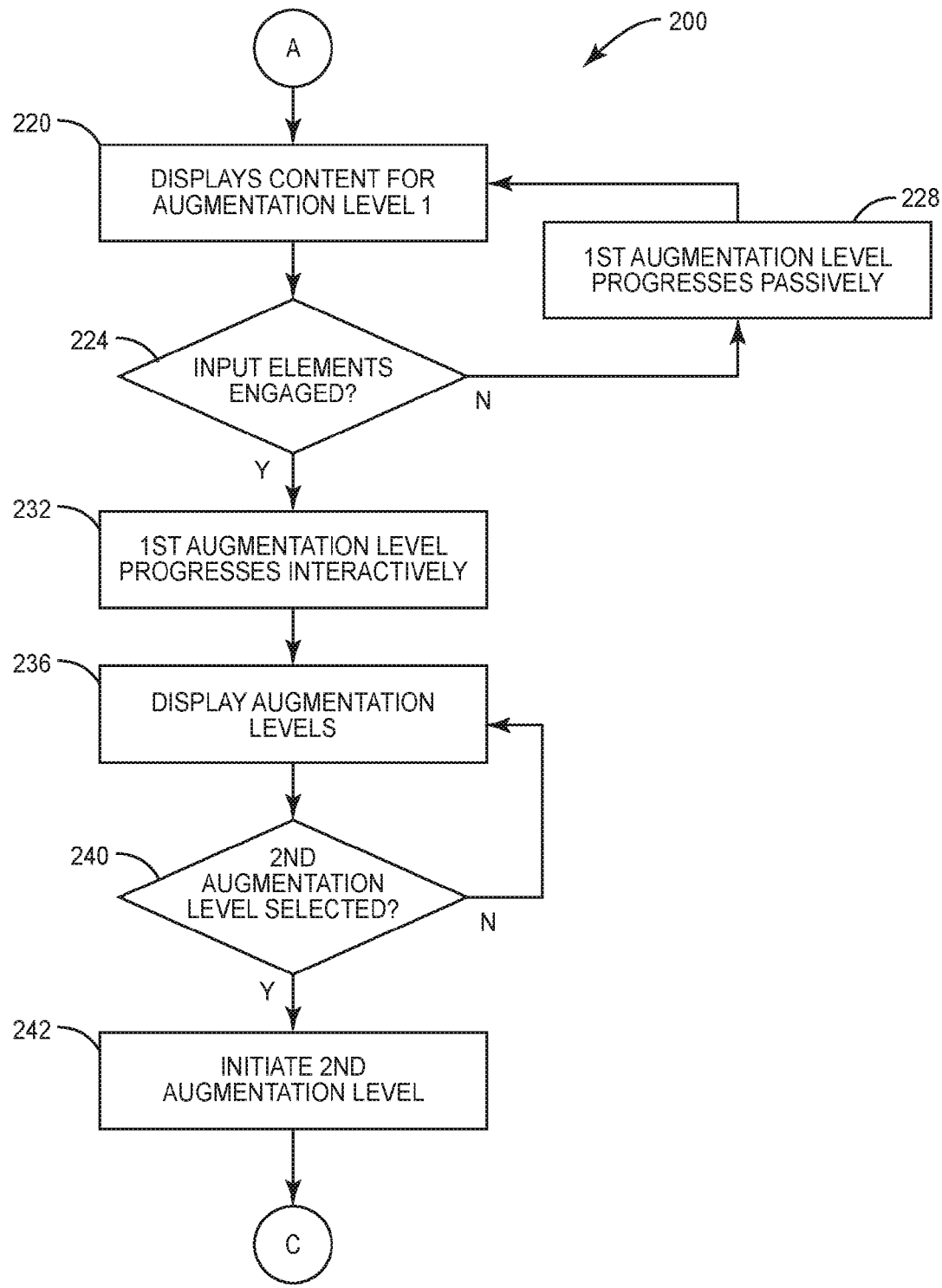
Figure 16C:
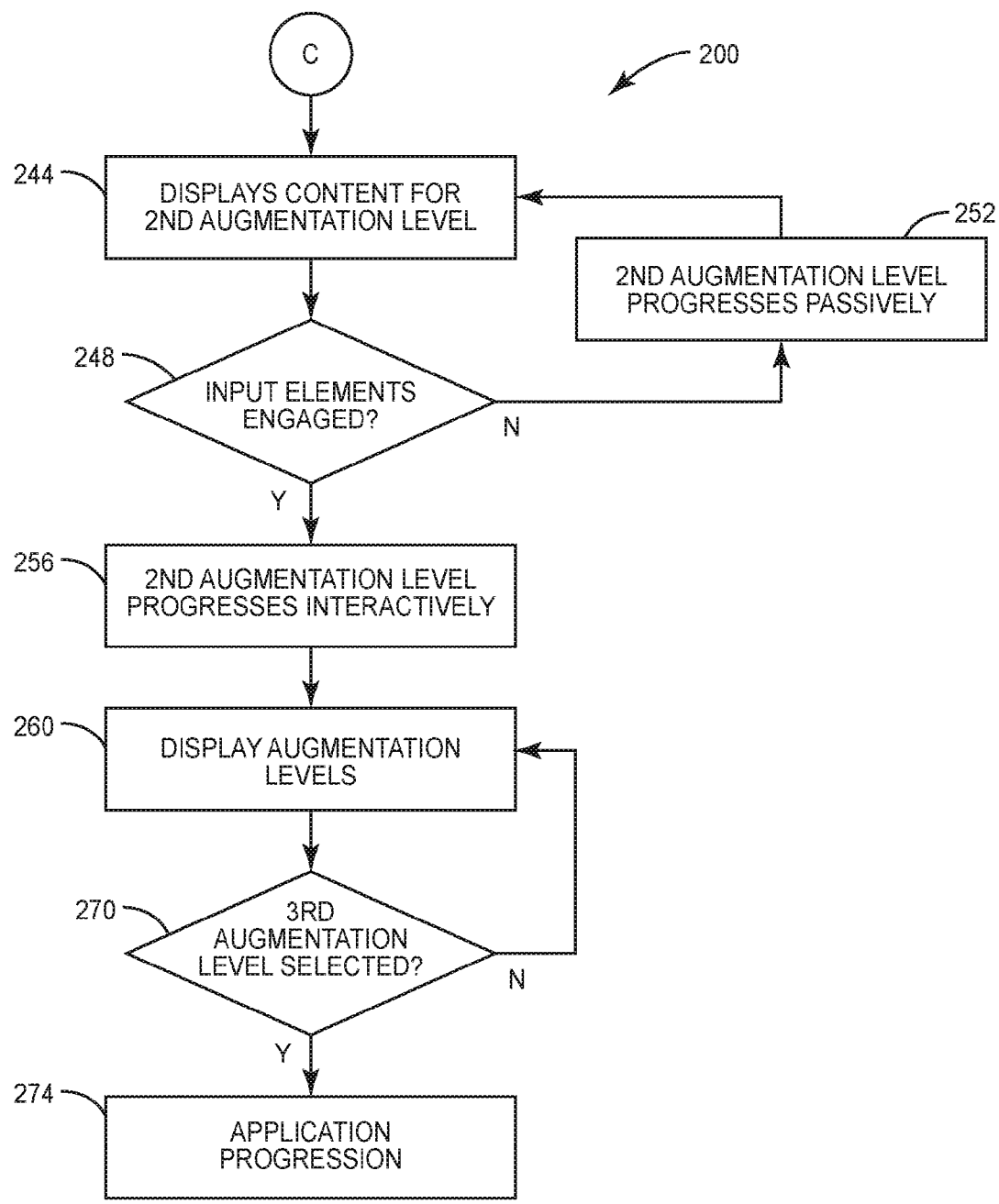

FIGS. 16A-16C illustrate a method 200 for implementing an augmented reality environment utilizing the interactive textile article 100 and computing device 20. The method initiates in block 202 when the user accesses and stores the application 30 on the computing device 20. In block 202, the user can input an electronic access code packaged with the textile article 100 into an interface on the computing device 20. For instance, the user can access a portal via the computing device 20 to download the application 30. In block 204, a scanning device on the scan a portion of an interactive textile article that includes a design object. In one example, scanning the textile includes capturing an image of the textile via a camera. In block 206, the application 30, for instance the image recognition module, identifies one or more design object identifiers of the design object in the image. In block 210, the application compiles a design object depiction based on the one or more design object identifiers contained in the design object. Process control is transferred to block 214.

In block 214, the first augmented content level is initiated. Process control is transferred to block 220. In block 220 (FIG. 16B), the first augmented content level displays on the screen 90 (FIG. 1) 1) the design object depiction, 2) one or more augmentation elements that are related to the design object, and 3) at least one input element that controls one of the design object depiction and the one or more augmentation elements.

In block 224, the application determines if the input elements are engaged. If the input elements have not been engaged, process control is transferred to block 228. In block 228, the first augmentation level progressives passively. If the input elements have been engaged, process control is transferred to block 232, where the first augmentation level progresses interactively. For instance, the user can control interaction of the design object depiction with the at least one augmentation elements.

In block 236, the application causes the display of portals or elements, the selection of which cause the display of additional augmentation levels, such as the second augmentation level. In block 240, the application determines if the second augmentation level element has been selected by the user. If the second augmentation level element is not selected by the user, process control is transferred to block 232. The user can progress though the first augmentation level interactively. If the second augmentation level element has been selected by the user, process control is transferred to block 242.

In block 242, the application initiates the second augmented content level. Process control is transferred to block 244. In block 244, the second augmented content level displays 1) the first design object depiction and/or the second design object depiction), 2) one or more second augmentation elements that are related to the respective design object, and 3) at least one second input element that controls at least one of the design object depiction and the one or more second augmentation elements. Process control is transferred to block 248.

In block 248, the application determines if the second input elements are engaged. If the second input elements have not been engaged, process control is transferred to block 252. In block 252, the second augmentation level progresses passively. If the second input elements have been engaged, process control is transferred to block 256, where the second augmentation level progressives interactively. For instance, the user can control interaction of the first and/or second design object depiction with the second augmentation elements.

In block 260, the application causes the display of content change elements 92 (FIG. 1). Selection of content change element 92 causes the display of additional augmentation levels, for example, such as the third augmentation level. In block 260, the application determines if the third augmentation level element has been selected by the user. If the third augmentation level element is not selected by the user, process control is transferred to block 256 and user can progress though the third augmentation level interactively. If the third augmentation level element has been selected by the user, process control is transferred to block 274. In block 274, the method progresses through steps similar to the steps illustrated in blocks 242 through 270. For instance, additional augmentation levels, such as the third augmentation level can be initiated. At each step (blocks 242 and 272) where a subsequent augmented content level is initiated, the application can cause the display of a payment portal to access the next augmented content level.

In another embodiment, multiple users can the networked together so as to interface within each other's augmented relatedly environments. As described above, each computing device 20a, 20b, 20c, . . . , 20n may be associated with a person or user. Each user can participate in an networked augmented reality environment by associating their computing device with a networking platform, such as a gaming or application platform (not shown). Once associated with the gaming platform, the user can enter and participate in one or more the augmented reality content levels described above. For example, a first user can be associated with a first computing device, which can include an augmented reality software program that executes the first augmented content level. A second user can be associated with a second computing device, which can include an augmented software program that is executing a first augment content level that is interfaced to the first augmented content level of the first computing device. The first and second users can each control their respective design object depictions and augmentation elements within a common augmented reality environment.

Another embodiment of the present disclosure is a method for making an augmented reality system including an interactive textile article. The method includes manufacturing a textile material to includes a design object having one or more design object identifiers. Then, the textile material is formed into a textile article, such as cutting an hemming and adding binding as needed. The textile article is packaged with one or more electronic access codes as described above. The codes can be tags, alphanumeric codes, QR codes, or hyperlinks. Input of the codes into an interface on the computing device 20 causes the augmented reality software application 30 to be stored on a memory of the computing device 20. As noted above, the textile article can be manufactured as according to formation systems described above. Such that the design object is printed on the textile material or the design object is integrally formed into the textile structure.

While the disclosure is described herein using a limited number of embodiments, these specific embodiments are not intended to limit the scope of the disclosure as otherwise described and claimed herein. The precise arrangement of various elements and order of the steps of articles and methods described herein are not to be considered limiting. For instance, although the steps of the methods are described with reference to a sequential series of reference signs and progression of the blocks in the Figures, the method can be implemented in a particular order, as desired.

What is claimed:

1. A system, comprising:
   a textile article including a textile material having a face and a back that is opposed to the face, at least one of the face and the back including a design object, the design object including one or more design object identifiers; and
   an augmented reality program configured to be stored in a memory of a computing device and executable by a processor of the computing device, the augmented reality program including a plurality of augmented content levels, wherein each augmented content level includes content related to the design object,
   wherein the augmented reality program when executed by the processor:
   a) compile a design object depiction that is based on the one or more design object identifiers included in the design object;
   b) progress through a first augmented content level of the plurality of augmented content levels, the first augmented content level configured to display on the computing device 1) the design object depiction and at least a portion of the textile article, 2) one or more first augmentation elements each of which include content that is related to the design object and the textile article, and 3) at least one first input element configured to control the design object depiction and the one or more first augmentation elements, wherein engagement of the one or more first augmentation elements and the at least one first input element cause progression through the first augmented content level; and
   c) progress to a second augmented content level of the plurality of augmented content levels in response to inputs received via the at least one first input element, the second augmented content level configured to display on the computing device 1) the design object depiction and the at least a portion of the textile article, 2) one or more second augmentation elements each of which include content that is related to the design object and the textile article, and 3) at least one second input element configured to control the design object depiction and the one or more second augmentation elements,
   wherein engagement of the one or more second augmentation elements and the at least one second input element cause progression through the second augmented content level.

2. The system of claim 1, wherein the textile article is a blanket, bed linen, a comforter, a rug, a carpet, a tapestry, a set of curtains, or a garment.

3. The system of claim 1, wherein the textile material is a woven fabric that defines a woven structure, wherein the design object is integrally formed into the woven structure.

4. The system of claim 1, wherein the textile material is a knit fabric that defines a knit structure, wherein the design object is integrally formed into the knit structure.

5. The system of claim 1, wherein the textile material is a pile fabric including a plurality of pile structures, and the design object is embodied in the plurality of pile structures.

6. The system of claim 1, wherein the design object is printed onto the textile material.

7. The system of claim 6, wherein the design object is digitally printed onto the textile material.

8. The system of claim 6, wherein the design object is sublimation printed onto the textile material.

9. The system of claim 1, wherein each design object identifier is an edge of the design object.

10. The system of claim 1, wherein each design object identifier is one or more portions of the design object.

11. The system of claim 1, wherein the processor is configured to execute a third augmented content level that includes the design object depiction, one or more third augmentation elements, and at least one third input device, and wherein engagement of the at least one third input element causes progression through the third augmented content level.

12. The system of claim 1, wherein the computing device includes a camera configured to obtain the image of the design object.

13. The system of claim 1, wherein the augmented reality program is configured to interface with one or more additional augmented reality programs running on one or more additional computing devices.

14. The system of claim 13, wherein the computing device is a first computing device, and the one or more additional computing devices is a second computing device, wherein respective augmented reality programs when executed by the processor interfaces the first augmented content level of the first computing device with the first augmented content level running on the second computing device in a common augmented reality environment displayed on the first and second computing devices.

15. The system of claim 1, wherein each design object identifier is a code embedded into or printed onto the textile material.

16. The system of claim 1, wherein each design object identifier is an electronic object identifier.

17. A method for progressing through augmented reality on a computing device, the method comprising the steps of:
   scanning, via the computing device, a portion of a textile article that includes a design object;
   identifying with a processor of the computing device one or more design object identifiers of the design object in the scanned portion of the textile article;
   compiling with the processor a design object depiction with the one or more design object identifiers that were identified from the scanned portion of the textile article, wherein the design object depiction is related to the design object and the portion of the textile article;
   initiating, via inputs into a user interface running on the computing device, a first augmented content level of a plurality of augmented content levels running on the computing device, the first augmented content level configured to display on the user interface: 1) the design object depiction with an image of the portion of the textile article, 2) one or more first augmentation elements that are related to the design object and the portion of the textile article, and 3) at least one first input element that controls at least one of the design object depiction and the one or more first augmentation elements;

in response to inputs into the at least one first input element received via the user interface, initiating a second augmented content level; and progressing through a second augmented content level of the plurality of augmented content levels in response to inputs received via the user interface, wherein the second augmented content level is configured to display on the user interface: 1) the design object depiction with the image of the portion of the textile article, 2) one or more second augmentation elements that are related to the design object and the portion of the textile article, and 3) at least one second input element that controls at least one of the design object depiction and the one or more second augmentation elements.

18. The method of claim 17, further comprising the step of controlling interaction of the design object depiction with the one or more augmentation elements.

19. The method of claim 17, further comprising the step of progressing through a series of displays of the first augmented content level.

20. The method of claim 17, wherein the step of progressing through the second augmented content level includes progressing through a series of displays of the second augmented content level.

21. The method of claim 17, further comprising the step of, after progression through the second augmented content level, initiating a third augmented content level so as to display 1) the design object depiction, 2) one or more third augmentation elements that are related to the design object, and 3) at least one third input element that controls at least one of the design object depiction and the one or more third augmentation elements.

22. The method of claim 21, further comprising the step of progressing through a series of displays of the third augmented content level.

23. The method of claim 17, where in the scanning step includes obtaining an image of the portion of the interactive textile.

24. A method for assembling an augmented reality system including an interactive textile article, the method comprising the steps of:

manufacturing a textile material from a plurality of fibers, the textile material having a face and a back that is opposed to the face such that at least one of the face and the back includes a design object, wherein the design object includes one or more design object identifiers;

forming the textile material into a textile article; and packaging the textile article with one or more electronic access codes, the input of which into a user interface running a portal on a computing device, causes an augmented reality software application to be stored on a memory of the computing device, wherein the augmented reality software application is configured to:

a) compile a design object depiction with an image of the textile article, wherein the design object depiction is based on the one or more design object identifiers; and b) initiate a first augmented content level of plurality of augmented content levels, so as to display on a user interface running on a computing device 1) the design object depiction with the image of the textile article, 2) one or more augmentation elements that are related to the design object, and 3) at least one input element that controls at least one of the design object depiction and the one or more augmentation elements; and c) progress to a second augmented content level of the plurality of augmented content levels in response to inputs received via the at least one first input element, the second augmented content level configured to display on the computing device 1) the design object depiction and the at least a portion of the textile article, 2) one or more second augmentation elements each of which include content that is related to the design object and the textile article, and 3) at least one second input element configured to control the design object depiction and the one or more second augmentation elements, wherein engagement of the one or more second augmentation elements and the at least one second input element cause progression through the second augmented content level.

25. The method of claim 24, wherein the manufacturing step includes printing the design object onto the textile material.

26. The method of claim 24, wherein the printing step includes one of: a) screen printing the design object onto the textile material; b) digitally printing the design object onto the textile material, and c) sublimation printing the design object onto the textile material.

27. The method of claim 24, where the textile material is a woven fabric, and wherein the manufacturing step includes interweaving a plurality of warp yarns with a plurality of weft yarns so as to define a woven structure that defines the design object and the design object identifier.

28. The method of claim 24, wherein the textile material is a knit fabric, and wherein the manufacturing step includes knitting knit fabric to include a plurality of different knit stitches, wherein the knit stitches define the design object and the design object identifier.

29. The method of claim 24, wherein the textile material is a pile fabric including a plurality of piles, wherein the manufacturing step includes forming the pile fabric such that the plurality of piles define the design object and the design object identifier.

* * * * *